Sept. 22, 1936.  H. C. CLAUSER  2,055,277
FLOAT LIGHT
Filed Aug. 26, 1935

Inventor
Herbert C. Clauser

By Mason Fenwick & Lawrence
Attorneys

Patented Sept. 22, 1936

2,055,277

UNITED STATES PATENT OFFICE 2,055,277

FLOAT LIGHT

Herbert C. Clauser, Elkton, Md.

Application August 26, 1935, Serial No. 37,994

8 Claims. (Cl. 102—2)

This invention relates to float lights of the weighted buoyant type designed to be dropped from aircraft into underlying bodies of water, adapted to float uprightly and illuminate for a long period of time an extensive area, for night landing, or emitting a dense smoke for indicating particular locations on the surface of the body of water, and for signalling purposes generally.

Such float lights as are known comprise a longitudinally bored body of wood or other light material, weighted with a bullet-shaped metallic cap at one end, and having the longitudinal bore open at the opposite or upper end forming a smoke or flame nozzle. A capsule of suitable pyrotechnic composition is inserted in the bore, and which may be ignited by a fuse set alight prior to the dropping of the flare, or by a percussion cap ignited by means actuated by the shock of contact of the float light with the water.

All types of float lights as at present known are subject to one or more serious objections. In the fuse type, the fuse is apt to go out, or be quenched by the immersion of the float light. Those which are ignited by the detonation of a percussion cap, in general burn upward from the bottom of the capsule and require a more or less complicated construction for by-passing the combustion products from the bottom to the top of the capsule within the body of the float light. In most of them, no provision is made for preventing the water from rushing in at the open upper end and during initial submergence which may quench the ignition. The general object of the present invention is to construct a float light in which simplicity of construction goes side by side with reliability in functioning.

One of the objects of the invention is to provide a float light actuated by impact with the water comprising a wooden or like body portion into the bore of which a capsule of pyrotechnic substance is snugly inserted, said body portion itself being formed so as to afford a by-pass for the products of combustion from the bottom to the top of the capsule without the necessity of employing any complicated cages or other surrounding means which characterize known float lights.

Another object of the invention is to provide a float light having the wooden body snugly receiving the pyrotechnic capsule, the latter containing an oxygen evolving substance to provide the oxygen for support of combustion of the pyrotechnic ingredients, the body being formed so as to minimize the charring of the wood thereof, thus conserving to its intended use a certain amount of oxygen which would be otherwise consumed in burning the wood of the body.

More specifically, an object of the invention is to provide the wooden body in the capsule receiving zone with a series of longitudinal channels providing gas passages for the combustion products which latter thus become interposed between the incandescent capsule and the major portion of the surrounding surface of the wooden body, thus protecting the wood from the intense heat of the capsule, the channels defining between them narrow ridges of wood which alone constitute the allocating and supporting means for the pyrotechnic capsule and which present a minimum wooden surface to the destructive temperature of the capsule.

Still another object of the invention is the connecting of the longitudinal gas passages by annular gas passages thereby equalizing the gas pressure on all sides of the capsule and producing a symmetrically shaped flame or jet of smoke.

A further object of the invention is to provide a water-tight construction of capsule which shall insure the ready inflammability of its contents not only when the float light is immersed in water, but after long periods of storage in damp places.

Another object of the invention is to provide an inwardly closing check valve in the open end of the float light adjacent the top adapted to close under water pressure at the instant of immersion of the float light, the upper surface of said check valve draining to the outside of the float light as soon as the latter comes up again above the surface of the water, preventing entrance of water to the interior of the float light, the gas pressure resulting from the ignition of the contents of the capsule acting to maintain the check valve open during the period of combustion.

Other objects of the invention will appear as the following description of a preferred and practical embodiment thereof proceeds.

In the drawing which accompanies and forms a part of the following specification and throughout the several figures of which, the same characters of reference have been employed to designate identical parts:

Figure 1:
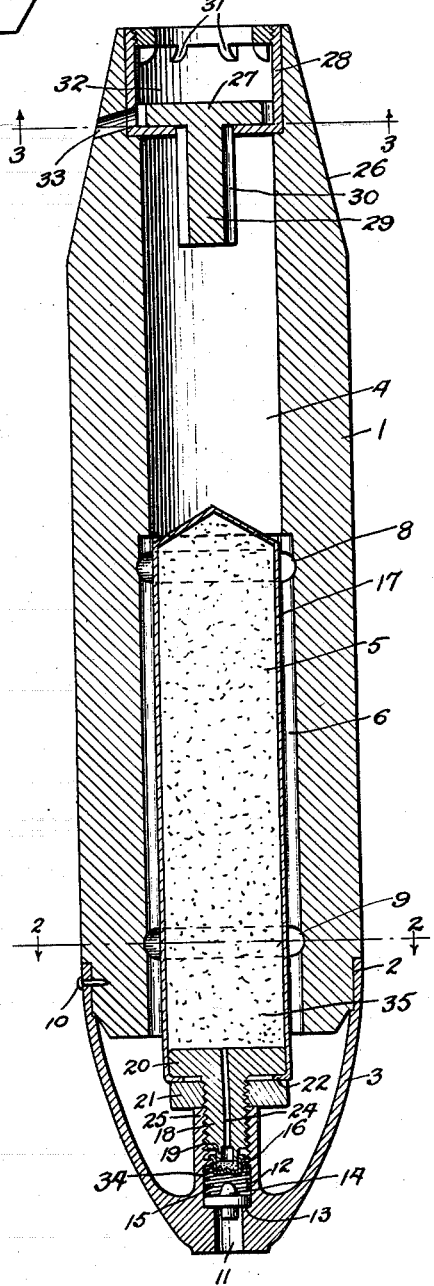
Figure 1 is a longitudinal diametrical section through a float light embodying the principles of the present invention.

Referring now in detail to the several figures, the numeral 1 represents a cylindrical body which is preferably of wood, although it may be made of any light floatable substance or even of hollow sheet metal providing the displacement of the float light causes it to be buoyant. The lower end of the body 1 is formed with a rabbet 2 constituting a seat for the bullet-shaped head 3 which is of metal and sufficiently heavy to cause the device to float in an upright position.

The body 1 has a longitudinal bore 4 extending therethrough, the lower part of which constitutes a receiving chamber for the pyrotechnic capsule 5. The walls of the bore substantially throughout the extent of this receiving chamber are corrugated or fluted as indicated by the ridges 6 in Figure 2, the ridges 6 alternating with channels 7. The capsule 5 is of such size as to preferably make snug contact with the ridges 6, the channels 7 then constituting longitudinal gas passages embracing the circumference of the capsule 5 and extending from the top to the bottom thereof.

Upper and lower annular channels 8 and 9 are provided, intersecting the longitudinal channels 7 and ensuring an even distribution of gas pressure on all sides of the capsule 5 when the latter is burning. The head 3 is secured to the rabbet 2 in any suitable manner. It is preferably a friction fit and therefore water and gas-tight and in addition may be mechanically secured as by screws 10. The head 3 has a bore 11 in its advance end expanding into a counterbore 12 at a short distance inwardly of the end of the head 3 forming a shoulder 13. An impact hammer 14 is reciprocable within the said counterbore, said hammer normally being biased against the shoulder 13 by a light spring 15 which reacts between the hammer and an inward flange 16 rising from the surface of the counterbore.

The pyrotechnic capsule 5 comprises a tube 17 made of any suitable material, such for example as a heavy grade of foil, tin, or other water-proof substance having a threaded tubular extension 18 protruding from its beneath end and terminating in a reduced nipple 19. The extension 18 has a broad base 20, and screwing down upon said extension toward said base is a nut 21. The base 20 of the extension is inserted in the mouth of the capsule 5 after the latter has been charged with the necessary ingredients. The end margin of the capsule 5 is then bent over the base 20 as illustrated at 22 in Figure 1 and the nut 21 screwed down against the overturned edge 22 forming a moisture-tight seal. The extension 18 as well as the reduced nipple 23 has a passage 24 leading into the interior of the capsule 5.

In assembling the device, the screws 10 not yet having been put in place, the head is removed, the extension 18 of the capsule is screwed into the socket 25 which is an inner continuation of the counterbore 12 and the capsule 5 then slidably inserted into the bore 4 of the body 1, the head 3 being slipped upon the rabbet 2 of the parts being secured together by means such as the screws 10.

The upper end of the body 1 is preferably, although not necessarily tapered as indicated at 26, and the upper end of the bore 4 is closed by means of a check valve 27. Said check valve preferably covers a hole in the bottom of a cup-shaped valve chamber 28 pressed or otherwise secured in water-proof manner in the upper end of the bore 4. The stem 29 of the check valve is preferably fluted as at 30 so as to provide passage for the gaseous products of combustion through said check valve when the latter is open. In its fully open position the check valve engages the lugs 31 which keep the check valve from closing in an upward direction. The gases evolved in the course of combustion have sufficient pressure to hold the check valve in open position. The valve chamber 32 drains to the exterior of the float light through one or more apertures 33.

The combustible ingredients contained within the capsule 5 do not form part of the present invention, but may be selected according to the purpose for which the float light is to be employed. The ingredients are preferably such as have a thermite reaction progressively melting the material of the capsule as the combustion proceeds upwardly. For night use, the ingredients will logically contain substances capable of producing intense brightness of illumination. For daytime work, a smoke producing ingredient is of the greatest importance. In either event it is obvious that since the ignition will occur while the float light is completely submerged no extraneous oxygen is available and the pyrotechnic composition must carry an ingredient evolving the oxygen necessary for the burning, as the combustion progresses.

In operation, the float light is dropped from the aircraft in unlighted condition and on account of the weight of the head 3 it plunges into the water head first. It is assumed that the altitude from which it is dropped creates a velocity that will cause it to strike the water with great violence that will cause it to plunge several feet beneath the water. Practically simultaneously will the check valve at the top close preventing the entrance of water into the body of the float light, and the impact hammer 14 will be struck a blow that forces it against the percussion cap 34 which is seated upon the nipple 23. Detonation of the percussion cap will ignite the starting composition 35 in the lower, that is to say, anterior part of the capsule 5. As the ignition continues, the gases of combustion from the lower part of the capsule 5 will be forced upward through the channels 7 and through the upper part of the bore 4 and past the flutes 30 on the stem of the check valve, lifting the valve and issuing annularly from around the undulating peripheral surface 36 of the valve 27, and through the spaces between the lugs 31. The issuing jet will be either a flame by night or a smoke cloud in the daytime, according to the nature of the composition.

On account of the fact that the channels 7 constitute a major portion of the surface of the wooden body 1, which surrounds the capsule 5, the combustion products passing upward constitute a protective gaseous envelope shielding the major proportion of the wood from the intense heat created by the combustion of and within the capsule 5 and which is, as stated, preferably a thermite reaction at high temperature.

Figure 2:
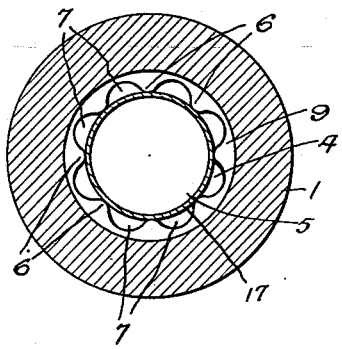
Figure 2 is a cross section taken along the line 2—2 of Figure 1.
Figure 3:
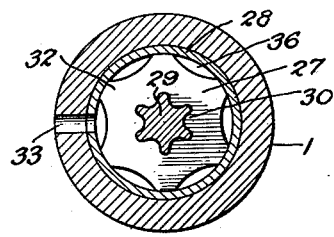
Figure 3 is a cross section taken along the line 3—3 of Figure 1.

It will be noted from Figure 2 that the ridges 6 are a small proportion of the surrounding wooden surface and consequently only a relatively small part of the wood is subject to the direct and charring action of the temperature of the combusting capsule. Since oxygen is necessarily consumed in charring the wood, it will be understood that a minimum proportion of the precious oxygen evolved within the capsule 5 is wasted in burning the surrounding wooden surface and consequently a greater proportion of oxygen is available for supporting the combustion of the flame or smoke producing pyrotechnic ingredients, this feature producing a longer period of operation of the float light.

It will be understood of course that the presence of the annular connecting channels 8 and 9 respectively adjacent the top and lower portions of the capsule 5 and intersecting the longitudinal channels 5, is not altogether essential, but they are of advantage in uniformly distributing the combustion gases, not only protecting the wood equally on all sides of the capsule, but producing a symmetrical jet at the mouth of the float light.

While I have in the above description disclosed what I believe to be a preferred and practical embodiment of the invention, it will be understood to those skilled in the art that the details of construction as illustrated and described are merely by way of example and not to be construed as limiting the scope of the invention as claimed.

What I claim is:

1. Float light comprising a tubular buoyant body having a heavy head insuring its floating substantially axially vertical, a pyrotechnic capsule in the lower portion of said tubular body, the inner wall of said capsule-receiving portion having an annular series of longitudinal channels defining between them ridges engaging the wall of said capsule, said channels functioning as by-passes for the gaseous products of combustion of said capsule and contents, said head having a bore co-axial with the bore of said body and opening thereinto, a percussion cap in said head bore in operative relation to said capsule, a hammer in said head bore exposed to impact of the water for igniting said percussion cap.

2. Float light comprising a tubular buoyant body having a heavy head insuring its floating substantially axially vertical, a pyrotechnic capsule in the lower portion of said tubular body, the inner wall of said capsule-receiving portion having an annular series of longitudinal channels defining between them ridges engaging the wall of said capsule, said channels functioning as by-passes for the gaseous products of combustion of said capsule and contents, said head having a bore co-axial with the bore of said body and opening thereinto, a percussion cap in said head bore in operative relation to said capsule, a hammer in said head bore exposed to impact of the water for igniting said percussion cap, said body having an inwardly closing check valve at its outer end excluding water and opening under gas pressure from within.

3. Float light comprising a tubular buoyant wood body having a heavy head insuring its floating substantially axially vertical, a pyrotechnic capsule in the lower portion of said tubular body, the inner wall of said capsule-receiving portion having an annular series of longitudinal channels defining between them ridges engaging the wall of said capsule, said channels functioning as by-passes for the gaseous products of combustion of said capsule and contents, said head having a bore co-axial with the bore of said body and opening thereinto, a percussion cap in said head bore in operative relation to said capsule, a hammer in said head bore exposed to impact of the water for igniting said percussion cap.

4. Float light comprising a tubular buoyant wooden body having a heavy head insuring its floating substantially axially vertical, a pyrotechnic capsule in the lower portion of said tubular body, the inner wall of said capsule-receiving portion having an annular series of longitudinal channels defining between them ridges engaging the wall of said capsule, said channels functioning as by-passes for the gaseous products of combustion of said capsule and contents, said head having a bore co-axial with the bore of said body and opening thereinto, a percussion cap in said head bore in operative relation to said capsule, a hammer in said head bore exposed to impact of the water for igniting said percussion cap, said body having an inwardly closing check valve at its outer end excluding water and opening under gas pressure from within.

5. Float light comprising a tubular buoyant wooden body having a heavy head insuring its floating substantially axially vertical, a cylindrical pyrotechnic capsule received in the lower portion of said tubular body, the interior wall of said capsule-receiving portion being formed with an annular series of channels defining between them narrow wooden ridges engaging the wall of said capsule, said channels functioning as by-passes for products of combustion from said capsule and its contents, said head having a bore co-axial with the bore of said body and opening thereinto, a percussion cap in said head bore in operative relation to said capsule, a hammer in said head bore exposed to impact of the water for igniting said percussion cap, the capsule-receiving portion of said body bore being provided with annular channels adjacent the upper and lower ends of said capsule intersecting said longitudinal channels for uniformly distributing the gaseous pressure to said channels.

6. Float light comprising a tubular buoyant wooden body having a heavy head insuring its floating substantially axially vertical, a cylindrical pyrotechnic capsule received in the lower portion of said tubular body, the interior wall of said capsule-receiving portion being formed with an annular series of channels defining between them narrow wooden ridges engaging the wall of said capsule, said channels functioning as by-passes for products of combustion from said capsule and its contents, said head having a bore co-axial with the bore of said body and opening thereinto, a percussion cap in said head bore in operative relation to said capsule, a hammer in said head bore exposed to impact of the the water for igniting said percussion cap, the capsule-receiving portion of said body bore being provided with annular channels adjacent the upper and lower ends of said capsule intersecting said longitudinal channels for uniformly distributing the gaseous pressure to said channels, said body having an inwardly closing check valve at its outer end excluding water and opening under gas pressure from within.

7. Float light comprising a tubular buoyant wooden body having a heavy head insuring its floating substantially axially vertical, a pyrotechnic capsule snugly received in the lower portion of said tubular body, the inner wall of said capsule-receiving portion being formed with an annular series of longitudinal channels extending substantially the length of said capsule and defining between them narrow wooden ridges engaging the wall of said capsule and presenting the minimum amount of wood in contact with said capsule, said channels functioning to by-pass the gaseous products of combustion past the wall of said capsule and to protect the major portion of the wood from the intense heat incident to the combustion of said capsule, the latter containing among other ingredients an oxygen evolving substance the oxygen from which is designed to combine with the other pyrotechnic ingredients in supporting their combustion, said oxygen being thus conserved by being prevented from uniting with more than a minimum part of the surrounding wood.

8. Float light comprising a buoyant body having a heavy head insuring its floating vertically, said head having a bore, a percussion cap and hammer in said bore, said hammer being exposed to the impact of the water, said body having a relatively large bore in the portion adjacent said head and a relatively small counterbore in the portion remote from said head, co-axial with the larger bore and communicating therewith forming a shoulder, a pyrotechnic capsule in the larger bore having its end resting against said shoulder, the relative dimensions of said capsule and larger bore being such as to provide a gas passage, and said shoulder being formed to provide a gas passage between said shoulder and the abutting end of said capsule.

HERBERT C. CLAUSER.